(12) United States Patent
Dalal

(10) Patent No.: US 11,110,896 B2
(45) Date of Patent: Sep. 7, 2021

(54) PULSED LASER CLEANING OF DEBRIS ACCUMULATED ON GLASS ARTICLES IN VEHICLES AND PHOTOVOLTAIC ASSEMBLIES

(71) Applicant: TESLA, INC., Palo Alto, CA (US)

(72) Inventor: Phiroze Dalal, San Jose, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 16/408,671

(22) Filed: May 10, 2019

(65) Prior Publication Data

US 2019/0351873 A1   Nov. 21, 2019

Related U.S. Application Data

(60) Provisional application No. 62/672,251, filed on May 16, 2018.

(51) Int. Cl.
| | |
|---|---|
| *B60S 1/02* | (2006.01) |
| *B23K 26/16* | (2006.01) |
| *B23K 26/36* | (2014.01) |
| *B60R 11/04* | (2006.01) |
| *B08B 7/00* | (2006.01) |
| *B60R 11/00* | (2006.01) |

(52) U.S. Cl.
CPC .............. *B60S 1/02* (2013.01); *B08B 7/0042* (2013.01); *B60R 11/04* (2013.01); *B60R 2011/0005* (2013.01)

(58) Field of Classification Search
CPC .......... B60S 1/02–026; B23K 26/0006; B23K 26/02–043; B23K 26/16; B23K 26/36–361
See application file for complete search history.

(56) References Cited

U.S. PATENT DOCUMENTS

| | | | | |
|---|---|---|---|---|
| 4,720,621 A | * | 1/1988 | Langen | B23K 26/03 219/121.6 |
| 5,151,134 A | * | 9/1992 | Boquillon | B08B 7/0042 134/1 |

(Continued)

OTHER PUBLICATIONS

English translation of CN 11361527 (Year: 2020).*
English translation of CN 105459968 (Year: 2016).*

*Primary Examiner* — Michael A Laflame, Jr.
(74) *Attorney, Agent, or Firm* — Knobbe, Martens, Olson & Bear, LLP

(57) ABSTRACT

A cleaning system for a vehicle includes a beam optics assembly that emits a laser beam to irradiate a region on a glass article of the vehicle, debris detection circuitry that detects debris accumulated over the region, and control circuitry. The control circuitry calibrates a set of parameters associated with the laser beam emitted from the beam optics assembly based on detection of the debris accumulated over the region on the glass article, controls an exposure level of the laser beam on the debris accumulated based on calibration of the set of parameters associated with the laser beam, wherein the exposure level is controlled based on pulsing the laser beam at a calibrated rate that limits penetration of the laser beam to a depth that is less than a thickness of the glass article, and removes the debris accumulated over the region on the glass article using the laser beam.

10 Claims, 5 Drawing Sheets

(56) References Cited

U.S. PATENT DOCUMENTS

| | | | | |
|---|---|---|---|---|
| 5,954,712 | A * | 9/1999 | Goodman | A61B 18/20 606/12 |
| 7,946,301 | B1 * | 5/2011 | Walsh | B60S 1/30 134/123 |
| 10,384,651 | B2 * | 8/2019 | Kovarik | B60S 1/0491 |
| 2003/0147159 | A1 * | 8/2003 | Dube | G02B 27/0006 359/833 |
| 2012/0053387 | A1 * | 3/2012 | Thro | B08B 7/0042 588/306 |
| 2015/0218746 | A1 * | 8/2015 | Clowes | B23K 26/0622 8/137 |
| 2015/0362921 | A1 * | 12/2015 | Hanaoka | G05D 1/0274 701/23 |

* cited by examiner

PULSED LASER CLEANING OF DEBRIS ACCUMULATED ON GLASS ARTICLES IN VEHICLES AND PHOTOVOLTAIC ASSEMBLIES

CROSS-REFERENCE TO RELATED APPLICATIONS

The present U.S. Utility Patent Application claims priority pursuant to 35 U.S.C. § 119(e) to U.S. Provisional Application No. 62/672,251, entitled "PULSED LASER CLEANING OF DEBRIS ACCUMULATED ON GLASS ARTICLES IN VEHICLES AND PHOTOVOLTAIC ASSEMBLIES", filed May 16, 2018, which is hereby incorporated herein by reference in its entirety and made part of the present U.S. Utility Patent Application for all purposes.

TECHNICAL FIELD

The disclosure relates to surface cleaning technologies; and more particularly to laser-based surface cleaning technologies.

BACKGROUND

Glass articles are increasingly used in vehicles, photovoltaic panels, and other electronic devices. For example, in vehicles, such glass articles are typically used as rear-view mirrors, window panels, and windshields. In case of solar products, different types of glass or glass-like coatings are usually applied on exposed surface of the photovoltaic panels. Such glass articles are susceptible to accumulation of various types of dirt (or debris) that are usually present in the ambient atmosphere. The accumulation may further cause occlusion of certain regions on the glass articles and thereby, in certain critical scenarios, such occlusion may interrupt different support systems and/or users that rely on the glass articles. For example, certain regions on a windshield of a vehicle may include dirt spots that may occlude a view in line-of-sight (LOS) of a human driver during a journey. Similarly, accumulation of dirt on lenses of a camera mounted on a vehicle may cause errors in image acquisition. Thus, decisions made on the basis of such erroneous images may not be desirable. As another example, dirt accumulations on photovoltaic panels over a period of time may cause a decrease in a power capture efficiency of the solar panels, which may translate into lower power output for homes, offices, transport systems, or facilities that may depend on power from such solar panels.

Conventionally, different automated solutions for cleaning glass articles in a vehicle or a photovoltaic assembly usually rely on either a physical contact of a robotic brush with the glass articles or usage of sophisticated chemical solutions (for example, a soap solution) that may be sprayed over the glass articles. Although such automated solutions may clean glass articles, preparations for cleaning such glass articles may consume a significant time and the cleaning and drying period may add to overall unproductive time. Additionally, usage of chemical solutions may be unsuitable for glass articles installed in electronics devices (for example, cameras, dashboards, and the like) as such components may turn defective with application of such chemical solutions.

Further limitations and disadvantages of conventional and traditional approaches will become apparent to those one of ordinary skill in the art, through a comparison of described systems with some aspects of the present disclosure, as set forth in the remainder of the present application and with reference to the drawings.

SUMMARY

A cleaning apparatus and method for pulsed laser cleaning of debris accumulated on glass articles in vehicles and photovoltaic assemblies are substantially shown in, and/or described in connection with, at least one of the figures, as set forth more completely in the claims. These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed method and apparatus for pulsed laser cleaning of debris accumulated on glass articles in vehicles and photovoltaic assemblies. In one implementation, the cleaning apparatus may be installed as a modular device in a vehicle and may provide a contactless means to clean different glass articles, for example windshields, in-vehicle camera lenses, side windows, rear-view mirrors, and the like, in the vehicle by a pulsed laser beam. The cleaning apparatus provides a fast, robust, and chemical-free solution to clean different glass articles in vehicles and solar photovoltaic facilities. The solution can be integrated with other cleaning solutions that use wipers, water, or air sprays or chemical solutions to clean glass articles.

The cleaning apparatus may include a debris detection circuitry that may be configured to automatically detect debris accumulated on different localized regions of a glass article installed in a vehicle. Such detection of debris may be done by image processing techniques that may use different image sensors installed inside and outside of the vehicle. In addition to the detection, the position, content, and shape of the debris may be identified to facilitate the calibration of certain parameters that a beam optics assembly may use to adaptively irradiate a region on the glass article by the laser beam at a calibrated pulse rate.

The exposure level of the laser beam may be further controlled such that the laser beam that is pulsed at the calibrated rate, advantageously penetrate a depth that is less than the thickness of the glass article. Such control of the exposure level caused by the pulsed laser beam may mitigate a risk of damage to different in-vehicle components beneath the region in the vehicle. The utilization of a single cleaning apparatus based on adaptive laser beam-forming and adaptive calibration of parameters may ensure a minimum penetration possibility of the pulsed laser beam and only affect an intended region of the glass article accumulated with the debris. Further, the penetration possibility may be further minimized on the basis of selective application of protective coatings or layers on certain glass articles. For example, a protective coating or layer of Indium Tin Oxide or other materials on windshields may be applied to absorb or reflect the pulsed laser beam beyond a specific thickness of the glass articles.

Figure 1:
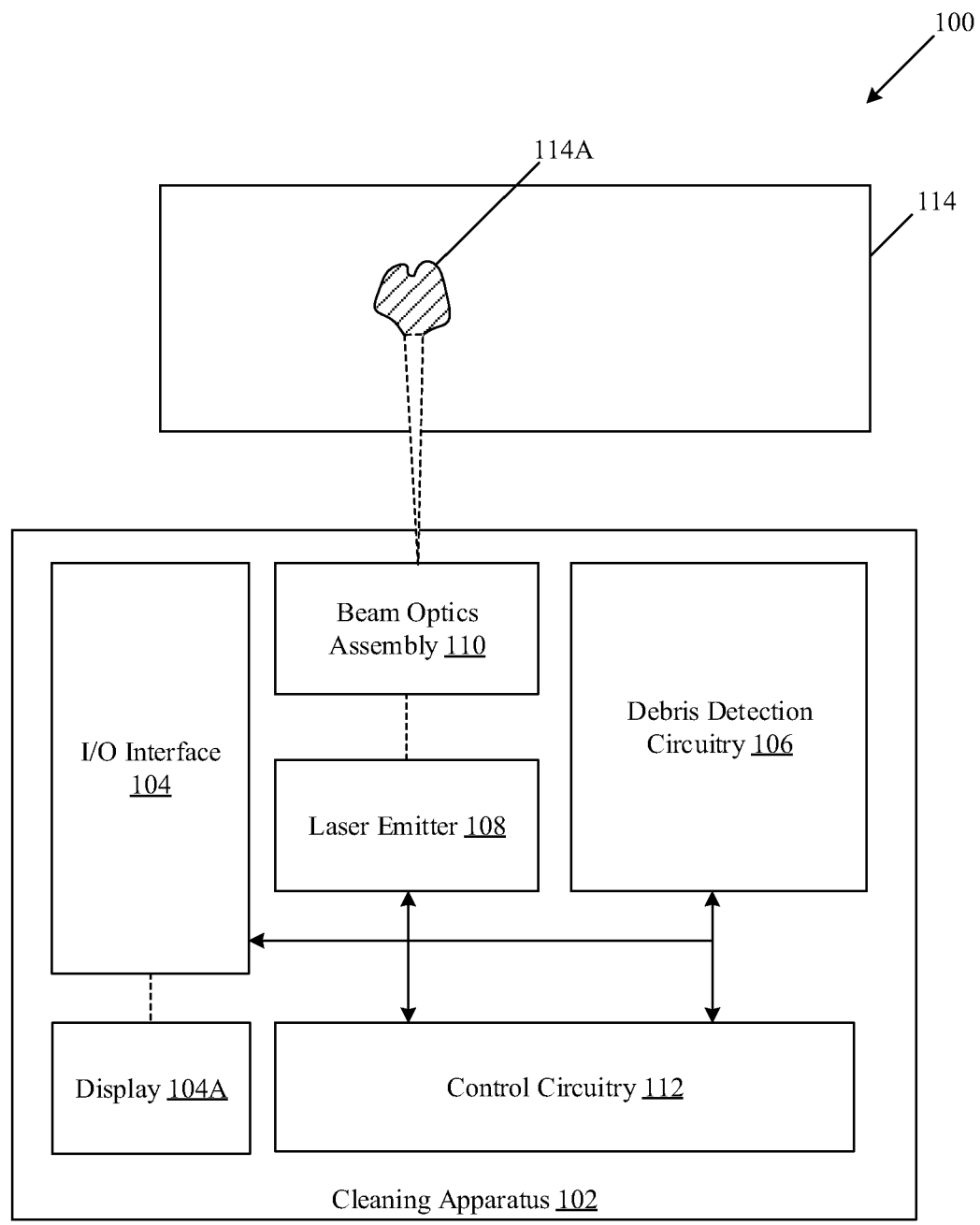
FIG. 1 is a block diagram that illustrates a cleaning apparatus for pulsed laser cleaning of debris accumulated on glass articles, in accordance with an embodiment of the disclosure.

FIG. 1 is a block diagram that illustrates a cleaning apparatus for laser cleaning of debris accumulated on glass articles, in accordance with an embodiment of the disclosure. With reference to FIG. 1, there is shown a block diagram 100 of a cleaning apparatus 102. The cleaning apparatus 102 may include an input/output (I/O) interface 104, a debris detection circuitry 106, a laser emitter 108, a beam optics assembly 110, and control circuitry 112. The control circuitry 112 may be communicatively coupled to the I/O interface 104, the debris detection circuitry 106, the laser emitter 108, and the beam optics assembly 110. There is further shown a glass article 114 associated with debris (for example, debris 114A) accumulated in a specific region of the glass article 114.

The cleaning apparatus 102 may comprise suitable logic, circuitry, interfaces, and movable components that may be configured to detect and irradiate debris accumulated in a region on the glass article 114 by a laser beam (acronym for Light Amplification by Stimulated Emission of Radiation) to further remove the detected debris by the laser beam. The cleaning apparatus 102 may be a modular device that may include different operational and non-operational components distributed in different sections of an installation environment. The cleaning apparatus 102 may be operationally configured to collectively operate in accordance with a type of the installation environment. For example, the cleaning apparatus 102 may be mounted on a vehicle such that a laser beam may be directed on the glass article 114 (or glass article(s)) installed at different sections of the vehicle. Different components of the cleaning apparatus 102 may be implemented in the installation environment such that the glass article 114 (or the glass article(s)) falls in line-of-sight (LOS) of such components, for example, the debris detection circuitry 106, the beam optics assembly 110, and the laser emitter 108.

The I/O interface 104 may comprise suitable logic, circuitry, and interfaces that may be configured to operate as an I/O channel/interface between a user and different operational components of the cleaning apparatus 102. The I/O interface 104 may facilitate an I/O device to receive an input from a user and present an output based on the provided input from the user. The I/O interface 104 may comprise various input and output ports to connect various I/O devices that may communicate with different operational components of the cleaning apparatus 102. Examples of the input devices may include, but are not limited to, a touch screen, a keyboard, a mouse, a joystick, a microphone, and other image capture devices. Examples of the output devices may include, but are not limited to, a display screen, a speaker, a haptic, or other sensory output device. In some embodiments, the I/O interface 104 may be further associated with a display 104A further implemented in the installation environment. In some embodiments, the I/O interface 104 may not be provided in the cleaning apparatus 102. In some other embodiments, the I/O interface 104 may be integrated with an infotainment system of a vehicle.

The display 104A may comprise suitable logic, circuitry, and interfaces that may be configured to render various types of information and controls via a user interface (UI). The UI may be a customized graphical UI (GUI) configured to display various types of information, controls, or settings to operate the cleaning apparatus 102. The cleaning apparatus 102 may also be controlled or operated by a hardware control button or a switch provided in the UI of the display 104A. The display 104A may be a touch screen configured to receive an input from the one or more occupants associated with the installation environment. Examples of the display 104A may include, but are not limited to, a display of the infotainment head unit, a projection-based display, a see-through display, and/or an electro-chromic display.

The debris detection circuitry 106 may comprise suitable logic, circuitry, and interfaces that may be configured to detect debris accumulated over a surface region on the glass article 114 in the installation environment, for example, a vehicle. Additionally, the debris detection circuitry 106 may locate and identify the debris or foreign depositions on specific regions that may cause occlusions of at least a portion of a scene in a field-of-view (FOV) viewed through the glass article 114, such as a camera lens or a vehicle front windscreen. In accordance with an embodiment, the debris detection circuitry 106 may include optical sensors (or image sensors) to capture an image (or a sequence of image frames) of the glass article 114 and a processor to scan the captured image of the glass article 114 to detect accumulation of the debris (localized over a surface region or distributed randomly).

Such optical sensors may identify different regions that occlude a scene in the FOV viewed through the glass article 114. Examples of optical (or image) sensors may include, but are not limited to, a camera or cameras built into the cleaning apparatus 102, a dash camera, a rear-view camera, and a surround view camera. In accordance with another embodiment, the debris detection circuitry 106 may include capacitive or resistive transparent layers overlaid on the glass article 114 that detect and locate accumulation of the debris on different regions of the glass article 114. In accordance with yet another embodiment, the debris detection circuitry 106 may use the principle of frustrated total internal reflection (FTIR).

The laser emitter 108 may comprise suitable logic, circuitry, and interfaces that may be configured to generate a laser beam that is associated with a set of parameters that may include any one or more of laser wavelength, frequency, pulse rate, spot radius, and beam width. The laser emitter 108 may include a laser source, a power circuit, and a pulsation circuit enclosed in a chassis. In some embodiments, the laser emitter 108 may be coupled to a cooling system, for example, a liquid coolant system. In some embodiments, the laser emitter 108 may not be coupled to the cooling system, and cooling may not be required. The laser source may be further implemented based on one of a solid state laser, a gas laser, an excimer laser, a dye laser, a semiconductor laser, and the like. In an embodiment, the laser source may emit a pulsed laser beam that may include ultra-short pulses of high energy (e.g., a 20 Watts laser) and the laser source may be a vertical cavity surface emitting laser (VCSEL).

The beam optics assembly 110 may be an optical setup that may be controlled to steer energy of an emitted laser beam and execute beamforming of the emitted laser beam as a focused laser beam across a specific region or an entire surface area of the glass article 114. The optics assembly may include a steering assembly and a beamforming assembly. The steering assembly may include at least one optical fiber, the first end of which may be linked to the laser source and the second end is linked to an input point for the beamforming assembly. The optical fiber in the steering assembly may transmit and steer the energy of the emitted laser beam from the laser source to the beamforming assembly. The beamforming assembly may include lenses, galvanometric mirrors, solid state, or other micro mirror arrays, laser windows, actuators, and the like. The beamforming assembly may calibrate different parameters in the set of parameters associated with the laser beam. The beamforming assembly may also be coupled directly or indirectly to the laser emitter 108 without the use of optical fibers.

The control circuitry 112 may comprise suitable logic, circuitry, and interfaces that may be configured to control an exposure level of the laser beam directed at debris accumulated on the glass article 114 for removal of the debris by the laser beam. The control circuitry 112 may provide control signals to different components of the cleaning apparatus 102, to set parameters associated with emission and beamforming of the laser beam, and locate and identify a type of the debris accumulated on the glass article 114. In accordance with an embodiment, the control circuitry 112 may be implemented on the basis of any one or more of a field programmable gate array (FPGA), a programmable logic device (PLD), an application-specific integrated circuit (ASIC), a programmable ASIC (PL-ASIC), an application-specific integrated parts (ASIPs), and a System-on-Chip (SOC) based on standard microprocessor units (MPUs) or digital signal processors (DSPs). In accordance with another embodiment, the control circuitry 112 may be further interfaced with a processor and/or a graphical processing unit (GPU). Examples of the processor may include, but are not limited to, a central processing unit (CPU), an x86-based processor, an x64-based processor, a reduced instruction set computing (RISC) processor, an application-specific integrated circuit (ASIC) processor, and a complex instruction set computing (CISC) processor.

The glass article 114 may be a specific article installed in different components of a vehicle or a photovoltaic assembly. Examples of different components that include the glass article 114 (or glass articles) may include, but are not limited to, driving mirrors, side mirrors, rear-view mirrors, front-view mirrors, door windows, front and rear windshields, heads-up display (HUD), headlights, indicator lights, taillights, brake lights, and driving lamps in vehicles, solar panels, glass roof tiles, and solar reflectors in a photovoltaic or solar thermal assembly. In accordance with an embodiment, different sensors that include the glass article 114 may be further installed in a vehicle and a photovoltaic assembly. Examples of such sensors may include, but are not limited to, rear-view cameras, dash cameras, automotive HUD, and display screens.

In operation, different sensors in the debris detection circuitry 106 may execute a scan across the surface of the glass article 114 to detect accumulation of debris (for example, the debris 114A) on the glass article 114. The scan may be executed for detection of the debris on a localized surface region of the glass article 114, or a non-localized distribution (scattered) area of the glass article 114. Examples of different debris that may be accumulated on the glass article 114 may include, but are not limited to, snow, water droplets, paint, bird-droppings, bug-splats, plant-sap, oil spills, grimes, dirt, and mud. For example, in some cases, the windshield of a vehicle may accumulate bird droppings in different localized or specific regions of the windshield. In some cases, dirt may deposit or be scattered over the windshield. The execution of the scan may be done in accordance with a control signal. In one instance, such a control signal may be received in response to an input from a user, via the I/O interface 104 of the cleaning apparatus 102. In another instance, such a control signal may be programmatically implemented based on an interrupt cycle or a polling cycle executed by the control circuitry 112, in conjunction with different sensors in the debris detection circuitry 106.

Initially, the debris detection circuitry 106 may be configured to identify whether an accumulation detected based on execution of the scan of the surface of the glass article 114 is debris (for example, the debris 114A). Such accumulation may cause occlusion of at least a portion of a scene in FOV of user or a camera when viewed through the glass article 114. Such identification may be done to segregate removable accumulations (or debris) from non-removable accumulations or intentionally arranged occluding objects. For example, in the scan result, the windshield may include different regions covered by the non-removable accumulations. Examples of the non-removable accumulations includes, but are not limited to a sticker, a brand logo, a promotional logo, a personalized logo, and the like. Similarly, the identified regions may include certain other objects, for example, sun shades on windows of a vehicle, wiper blades, clothes, flags, or other objects.

Figure 2A:
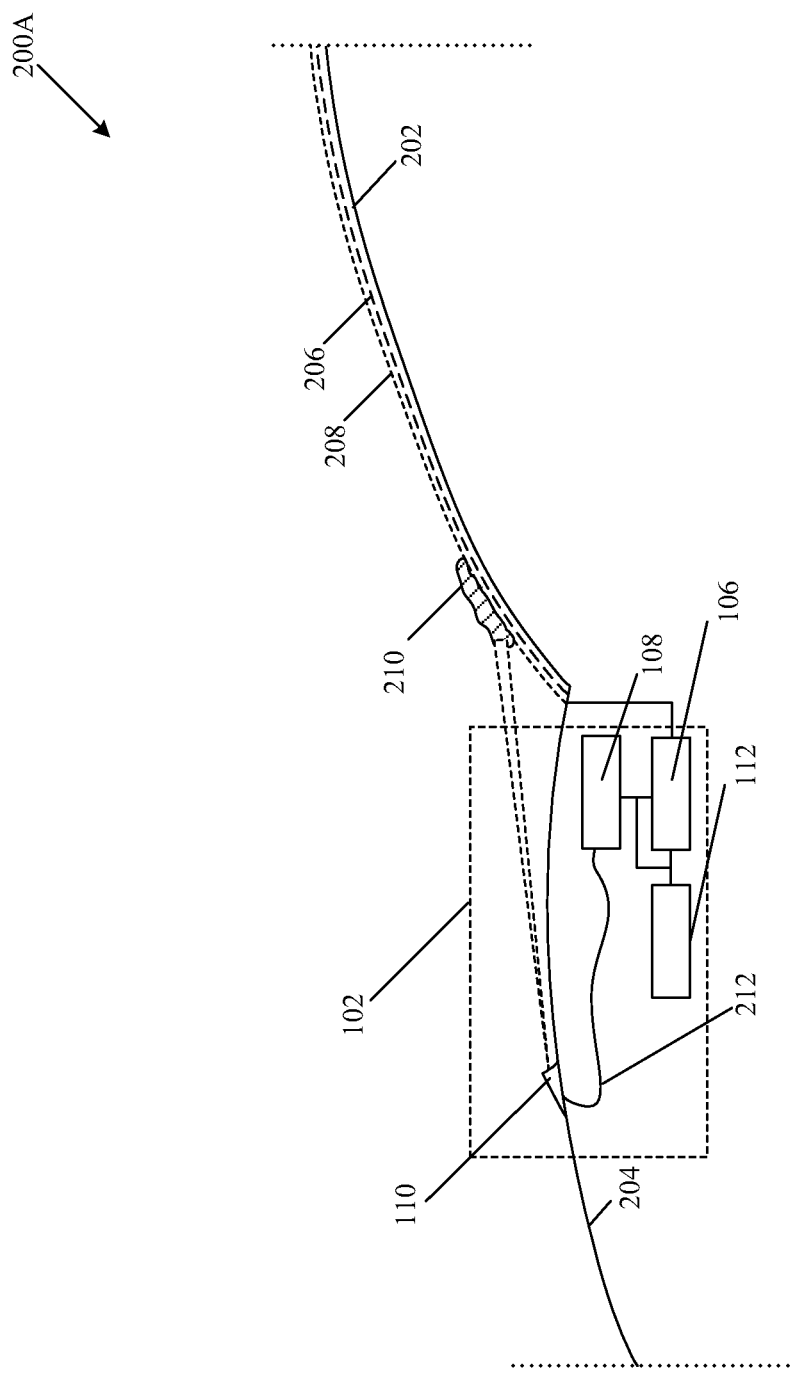
FIG. 2A illustrates a windshield and a bonnet portion of a vehicle configured with the cleaning apparatus of FIG. 1, in accordance with an embodiment of the disclosure.
Figure 2B:
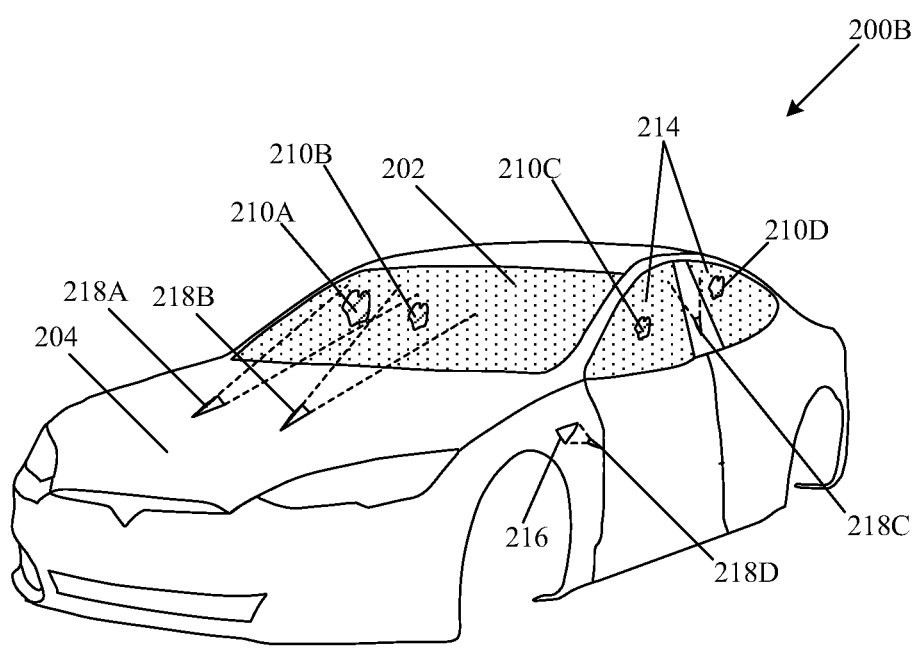
FIG. 2B illustrates a vehicle installed with different beam optics assemblies for different glass articles in the vehicle, in accordance with an embodiment of the disclosure.
Figure 3:
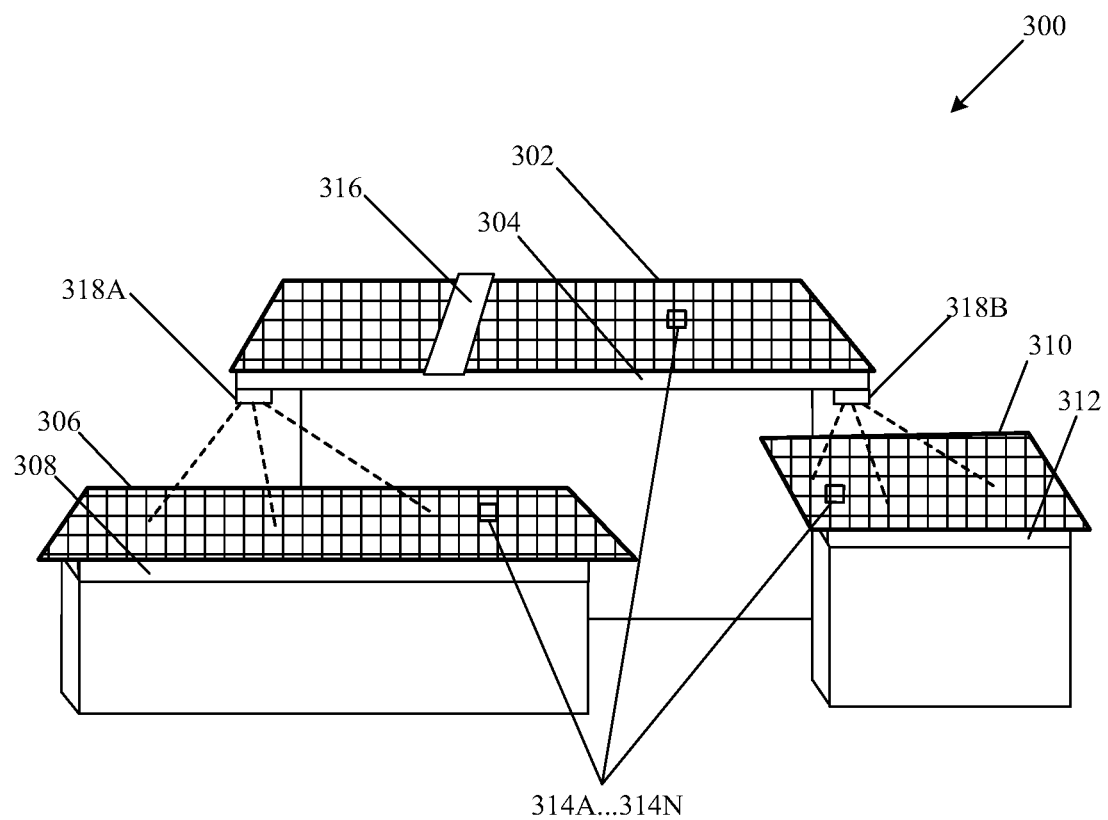
FIG. 3 illustrates a solar photovoltaic facility equipped with the cleaning apparatus of FIG. 1, in accordance with an embodiment of the disclosure.

The debris detection circuitry 106 may be further configured to detect the debris accumulated on the glass article 114 installed, for example, in a vehicle (See FIGS. 2A, and 2B) or a photovoltaic assembly (See FIG. 3). In accordance with an embodiment, the debris detection circuitry 106 may include the optical sensors (or image sensors) to visually detect the distribution of debris on the surface of the glass article 114. The optical sensors (or image sensors) may be positioned such that the glass article 114 is present in an LOS of the optical sensors (or image sensors). In the LOS region, such optical sensors (or image sensors) may capture a sequence of images of the glass article 114. The captured sequence of images may be utilized to detect a plurality of locations associated with the accumulations of the debris on the glass article 114. Additionally, the captured sequence of images may provide a measure of a rate, a pattern, a time duration of accumulation of the debris on different localized or non-localized regions on the glass article 114.

In accordance with another embodiment, the debris detection circuitry 106 may include a capacitive layer coated on the surface of the glass article 114. The capacitive layer may be energized by the debris detection circuitry 106. The capacitive layer may be responsive to debris accumulations that contact the surface of the capacitive layer. The capacitive layer may be unresponsive to debris accumulations that may not be in contact with the capacitive layer, for example, debris accumulation on a side that is opposite to the capacitive layer on the glass article 114. In such cases, other techniques that rely on non-contact methods to debris detection may be utilized, for example, image sensors, laser scanners, and the like. A portion of the capacitive layer that may exhibit a variation in capacitance values with respect to known or expected capacitance values may be utilized to detect and locate an accumulation of the debris in a region of the glass article 114.

In accordance with another embodiment, the debris detection circuitry 106 may be configured to utilize Frustrated Total Internal Reflectance (FTIR) as an alternative non-contact method of debris detection. In cases where another surface is in contact or at close proximity to a totally internally reflecting surface, the total internal reflection may be frustrated. Thus, to locate an accumulation of the debris in a region of the glass article 114 (such as a vehicle window) that may act as one surface layer that is in contact or at close proximity to the totally internally reflecting surface layer (a special coating). Any change in intensity of evanescent wave at a particular region passing through such surface layer arrangement may indicate presence of debris at that particular region.

In some embodiments, the debris detection circuitry 106 is configured to determine a type of debris accumulated in a region on the glass article 114. The type of debris may be determined based on certain features, for example, including any one or more of a composition, a texture, a color, a shape, a state (solid or liquid), an odor, spectral absorption or reflection associated with debris, and the like. The detection of debris and associated information, such as a location and determined features, of the debris may be further provided to the control circuitry 112. In accordance with an embodiment, the control circuitry 112 may utilize the detected location of the debris (for example, the debris 114A) on the glass article 114 to determine a distance between the beam optics assembly 110 and the detected location of the debris on the glass article 114. Additionally, the control circuitry 112 may determine a range of horizontal and vertical sweep angles in a localized or a non-localized region that may be marked for a cleanup by the laser beam.

The control circuitry 112 may be configured to communicate a control signal to the laser emitter 108 based on information related to the detected debris on the glass article 114. The information related to the detected debris may include the detected location and area occupied by the debris, a range of horizontal and vertical sweep angles, determined features of the debris, determined distance between the beam optics assembly 110 and the debris, and the like. The laser emitter 108 may utilize the control signal received from the control circuitry 112 to calibrate a first set of parameters associated with a laser beam. The first set of parameters may be set as configuration parameters of the laser source. The laser source in the laser emitter 108 may be configured to emit a laser beam in accordance with the calibrated first set of parameters. The first set of parameters may include, but are not limited to, any one or more of wavelength associated the emitted laser beam, frequency associated with the emitted laser beam, peak power of the emitted laser beam, a pulse duration of the emitted laser beam, and a number of pulses associated with the emitted laser beam. The wavelength of the laser beam may be further calibrated such that the laser beam affects only the targeted debris, without a penetration of the glass article 114.

The emitted laser beam may have required power levels to efficiently reach and target the detected debris in a localized region or a non-localized region. However, the emitted laser beam may require beamforming and steering at specific horizontal and vertical sweep angles, to effectively remove the debris accumulated in a localized or a non-localized region of the glass article 114. Therefore, the control circuitry 112 may utilize the beam optics assembly 110 to steer and execute beamforming of the emitted laser beam such that the pulsed laser beam may remove the detected debris efficiently in an optimal time period. The emitted laser beam may be initially steered from the laser source to the beamforming assembly, via the steering assembly. The steering assembly may include at least one optical fiber that connects the laser source to the input portion for the beamforming assembly. The optical fiber in the steering assembly may transmit and steer the emitted laser beam from the laser source to the beamforming assembly.

In certain scenarios, a single installation environment may include multiple beamforming assemblies that may utilize a single laser source to transmit a beamformed laser beam to different glass articles. For example, a vehicle may include multiple beamforming assemblies for windshields, windows, and camera lenses (as shown in FIG. 2B). In such an implementation, the single laser source may include optical splitters to split a single laser beam into two different laser beams that can be beamformed to target different regions on a single glass article or multiple glass articles. In accordance with an embodiment, instead of a single laser source, the laser emitter 108 may include a plurality of laser sources that may generate different laser beams from different laser sources to different beamforming assemblies in an installation environment. In accordance with an embodiment, an optical multiplexer may be utilized to distribute a single laser beam to different beamforming assemblies, via dedicated optical fibers for different beamforming assemblies.

The control circuitry 112 may further utilize actuators and/or other devices in beam optics assembly 110 to calibrate a second set of parameters associated with the emitted laser beam and components of the beamforming assembly. The second set of parameters may include any one or more of a spot radius formed by the laser beam on the glass article 114, a focal length of a lens (or a mirror) in the beam optics assembly 110, an angle of incidence (vertical and horizontal sweep angles) of the laser beam on the detected debris, and the like. Alternatively stated, the control circuitry 112 may adjust different parameters associated with the components of the beamforming assembly to adjust a beam width and the angle of incidence of the laser beam. For example, galvanic mirrors, micro mirror arrays, or specialized lenses may be steered horizontally and vertically to move the laser beam at horizontal and vertical sweep angles across the region of the debris on the glass article 114. In certain implementations, the beamforming assembly may include a specified arrangement of lenses, galvanic or micro mirrors, and laser windows to selectively target a detected debris in a localized or non-localized region of the glass article 114.

The beam optics assembly 110 may be effectively utilized to irradiate a region on the glass article 114 by a laser beam. The irradiance of the laser beam on the region accumulated with the detected debris may further require controlling an exposure level and an exposure period for optimal cleanup in a minimal time. Additionally, the irradiance of the laser beam may be controlled to prevent damage to other components that may lie in a range of the directed laser beam. For example, a seat or an electronic device positioned behind a windshield may be damaged due to an excessive exposure of the laser beam beyond a safe limit. Similarly, an image sensor chip in a camera may be damaged due to overexposure of the laser beam (or due to misconfiguration of the set of parameters), while the lens of the camera may be exposed to the laser beam for cleanup.

The control circuitry 112 may be further configured to control an exposure level of the laser beam on the detected debris accumulated on the glass article 114. The exposure level may be controlled based on the calibration of the first set of parameters and the second set of parameters associated with the laser beam. The exposure level may depend on a peak power value, a pulse duration, a pulse rate, an exposure period, and the like. The exposure level may be controlled such that the laser beam that is pulsed at a calibrated rate penetrates a depth that is less than the thickness of the glass article 114. With a limited penetration, the laser beam may affect only the exposed region of the debris on the glass article 114, without further penetration beyond a thickness of the glass article 114. The controlled exposure level may further be utilized to minimize a penetration possibility of the laser beam beyond the thickness of the glass article 114. Such a penetration possibility may be further minimized based on analysis of a specific geometric profile and a refractive index profile of the glass article 114 that contracts the debris. Alternatively, a laser barrier coating (for example, Indium Tin Oxide) may be further applied as a protective coating on or layer within the glass article 114 to facilitate absorption/reflection of a portion of energy of the laser beam (for example, as shown in FIG. 2A). The control circuitry 112 may utilize the laser beam to remove the detected debris accumulated on the region by the laser beam. The laser beam may be directed on the detected debris on the region at the controlled exposure level in the exposure period, to mitigate a risk of damage to different components beneath the region.

In some embodiments, the cleaning apparatus 102 may include a cooling system that may be installed with the cleaning apparatus 102 in the installation environment, for example, in front or back trunk of the vehicle. The cooling system may utilize suitable coolants to remove heat from heated operations of the laser emitter 108. The implementation of the cleaning apparatus 102 in a vehicle has been described, for example, in FIG. 2A, FIG. 2B, and in a photovoltaic assembly has been described, for example, in FIG. 3, respectively.

FIG. 2A illustrates a windshield and a bonnet portion of a vehicle configured with the cleaning apparatus of FIG. 1, in accordance with an embodiment of the disclosure. FIG. 2A is explained in conjunction with elements from FIG. 1. With reference to FIG. 2A, there is shown a portion 200A of a vehicle (e.g., the vehicle 200B of FIG. 2B). The portion 200A may include a windshield portion 202 and a bonnet portion 204. The windshield portion 202 may include a laser barrier coating 206 on the windshield portion 202 and a debris detection coating 208 on the laser barrier coating 206. A debris 210 may be accumulated over a specific region on the windshield portion 202, as shown.

In FIG. 2A, as shown, the cleaning apparatus 102 may be installed beneath the bonnet portion 204. The cleaning apparatus 102 may include the laser emitter 108 communicatively coupled to the beam optics assembly 110, via an optical fiber 212. Additionally, the cleaning apparatus 102 may include the debris detection circuitry 106 communicatively coupled to the debris detection coating 208, and the control circuitry 112 coupled to the debris detection circuitry 106, the laser emitter 108, and the beam optics assembly 110.

The debris detection circuitry 106 may be configured to detect debris (for example, the debris 210) accumulated over a region on the windshield portion 202 installed in the vehicle. The detection of the debris (for example, the debris 210) may be done based on a response from the debris detection coating 208. Alternatively stated, the debris detection coating 208 when in contact with the debris indicates a change in capacitance or resistance values with respect to known value of capacitance or resistance. Such change may be utilized to detect a presence of debris on the windshield portion 202.

In response to the detection, the control circuitry 112 may provide control signals to the laser emitter 108. The control circuitry 112 may further calibrate a first set of parameters associated with a laser beam emitted from the laser emitter 108. The laser emitter 108 may be configured to emit a laser beam in accordance with the calibrated first set of parameters. The first set of parameters may include, but are not limited to, wavelength associated the emitted laser beam, frequency associate with the emitted laser beam, peak power of the emitted laser beam, a pulse duration of the emitted laser beam, and a number of pulses associated with the emitted laser beam. Additionally, the wavelength of the emitted laser beam may be calibrated such that the laser beam may only affect the detected debris, without further penetration of the windshield portion 202. Thereafter, the laser beam may be routed or communicated to the beam optics assembly 110, via the optical fiber 212. In certain embodiments, the optical fiber 212 may be utilized to conveniently route the emitted laser beam to different beam optic assemblies that may be installed for a dedicated glass article, for example, glass windows, windshields, and rearview mirrors in the vehicle 200B.

The beam optics assembly 110 may include different optical components (for example, galvanic mirrors, micro mirror arrays, laser windows, specialized lenses, and actuators) to steer and execute beamforming of the laser beam received via the optical fiber 212. The beam optics assembly 110 may be utilized to calibrate a second set of parameters associated with the emitted laser beam at the beamforming stage. Such calibration may be done at the beam optics assembly 110, based on the detection of the debris accumulated over the region on the windshield portion 202. The second set of parameters may include a spot radius formed by the laser beam on the windshield portion 202, a focal length of a lens (or a mirror) in the beam optics assembly 110, an angle of incidence (vertical and horizontal sweep angles) of the laser beam on the detected debris, and the like. Thereafter, the beam optics assembly 110 may irradiate a region on the windshield portion 202 by the beamformed laser beam.

The control circuitry 112 may further control an exposure level of the laser beam on the detected debris accumulated on the windshield portion 202 based on the calibration of the first set of parameters and the second set of parameters associated with the laser beam. The exposure level may be controlled such that the laser beam that is pulsed at a calibrated rate penetrates a depth that is less than the thickness of the windshield portion 202. Such penetration may be further controlled based on the laser barrier coating 206 applied over a glass portion of the windshield portion 202. The laser barrier coating 206 may be a protective coating of a specialized material, for example, Indium Tin Oxide, over a glass article in the windshield portion 202 to absorb and reflect a portion of energy from the directed laser beam. The laser barrier coating 206 may be applied to minimize a possibility of penetration of the laser beam through the windshield portion 202. Such a penetration possibility may be further minimized by the use of a geometric profile and a refractive index profile of the windshield portion 202 to calibrate the first set of parameters and the second set of parameters. The control circuitry 112 may further steer the laser beam at horizontal and vertical sweep angles to remove the detected debris accumulated on the region of the windshield portion 202. The laser beam may be directed on the detected debris on the region at the controlled exposure level during an exposure period, to mitigate a risk of damage to different in-vehicle components beneath the region.

FIG. 2B illustrates a vehicle with different beam optics assemblies for different glass articles in the vehicle, in accordance with an embodiment of the disclosure. FIG. 2B is explained in conjunction with elements from FIG. 1 and FIG. 2A. With reference to FIG. 2B, there is shown a vehicle 200B that includes the windshield portion 202, the bonnet portion 204, side windows 214, and an indicator light 216. A first beam optics assembly 218A, a second beam optics assembly 218B may be installed on two ends of the bonnet portion 204, as shown. A third beam optics assembly 218C may be installed on a gap between the side windows 214. Additionally, a fourth beam optics assembly 218D may be further installed in vicinity of the indicator light 216.

In accordance with an embodiment, a single laser emitter (for example, the laser emitter 108 as shown in FIG. 2A) may be installed inside the vehicle 200B. The single laser emitter may split and transmit separate laser beams to the first beam optics assembly 218A, the second beam optics assembly 218B, the third beam optics assembly 218C, and the fourth beam optics assembly 218D, via separate optical fibers that lead to respective beam optics assemblies. In accordance with another embodiment, instead of a single laser emitter, a plurality of laser emitters may be installed inside the vehicle 200B. The plurality of laser emitters may individually transmit laser beams to the first beam optics assembly 218A, the second beam optics assembly 218B, the third beam optics assembly 218C, and the fourth beam optics assembly 218D, via separate optical fibers that lead to respective beam optics assemblies, or the plurality of laser emitters may be directly coupled to the individual beam optics assemblies. The control circuitry 112 may control the exposure levels, horizontal and vertical sweep angles (shown by dotted lines) individually, for removing debris. For example, a first debris 210A, a second debris 210B, a third debris 210C, and a fourth debris 210D detected on each of the windshield portion 202, the side windows 214, and the indicator light 216, may be removed.

It may be understood by one of ordinary skilled in the art that the laser beam has been calibrated to remove a debris on different glass articles without a penetration of such glass articles. However, the disclosure may not be limited to glass articles in the vehicle 200B and the laser beam may be calibrated to remove debris on ceramic tiles and metal panels, without a deviation from the scope of the present disclosure.

FIG. 3 illustrates a solar photovoltaic facility equipped with the cleaning apparatus of FIG. 1, in accordance with an embodiment of the disclosure. FIG. 3 is explained in conjunction with elements from FIG. 1, FIG. 2A, and FIG. 2B. With reference to FIG. 3, there is shown a solar photovoltaic facility 300. The solar photovoltaic facility 300 may include a first photovoltaic assembly 302 on a first rooftop 304, a second photovoltaic assembly 306 on a second rooftop 308, and a third photovoltaic assembly 310 on a third rooftop 312. Each of the first photovoltaic assembly 302, the second photovoltaic assembly 306, and the third photovoltaic assembly 310 may be coupled to each other to collectively harness solar energy. The solar energy may be harnessed via a plurality of solar panels 314A . . . 314N installed in the first photovoltaic assembly 302, the second photovoltaic assembly 306, and the third photovoltaic assembly 310, as shown.

The plurality of solar panels 314A . . . 314N may include a glass coating on the photosensitive layers that generate electrical energy in response to exposure to solar energy. The glass coating usually prevents the solar panel from damages that may be caused by ambient conditions or foreign debris, for example, rain, humidity, dust, rust, chemical exposure, and the like. However, the same glass coating provides a means for deposition or accumulation of debris on the glass coating. Such accumulation may reduce a solar cell/solar panel efficiency to capture power from the exposed solar energy by blocking a portion of the solar energy to efficiently reach the photosensitive layer (solar cells) of the plurality of solar panels 314A . . . 314N.

The first photovoltaic assembly 302 may be installed with a moving bar 316 on top of the first rooftop 304. The moving bar 316 may include certain components, such as the debris detection circuitry 106, the laser emitter 108, and the beam optics assembly 110, of the cleaning apparatus 102, for example, as shown in FIG. 1, The moving bar 316 may slide along a length of the first photovoltaic assembly 302 such that with each back and forth movement, the debris detection circuitry 106 (shown in FIG. 1) may scan the glass coating of the first photovoltaic assembly 302 and target the detected debris for removal at specific regions of the glass coating. Similarly, a first laser pod 318A and a second laser pod 318B may be installed at two distal end of the first rooftop 304 to efficiently cover an aperture of the second photovoltaic assembly 306 and the third photovoltaic assembly 310, respectively. In accordance with an embodiment, the first laser pod 318A and the second laser pod 318B may include all the components of the cleaning apparatus 102, integrated in a single standalone unit. Similar to the moving bar 316, the first laser pod 318A and the second laser pod 318B may scan the glass coating of the second photovoltaic assembly 306 and the third photovoltaic assembly 310 for accumulations of debris and subsequently target the detected debris at specific regions of the glass coating.

It is to be understood by one of ordinary skill in the art that the arrangement of different photovoltaic assemblies, moving bar 316, and laser pods has been described as specific configurations in the solar photovoltaic facility 300. However, the disclosure may not be so limited and photovoltaic assemblies, moving bar 316, and laser pods in a photovoltaic facility may vary in number, arrangements, and operational configurations, without a deviation from the scope of the present disclosure.

In certain scenarios, the disclosed apparatus and method for pulsed laser cleaning of debris accumulated on glass articles may also be utilized for architectural glass cleaning or cleaning of any other glass or glass-like surfaces. Examples of the architectural glass may include, but are not limited to window, glass panels used as building material, skylights, and the like.

Figure 4:
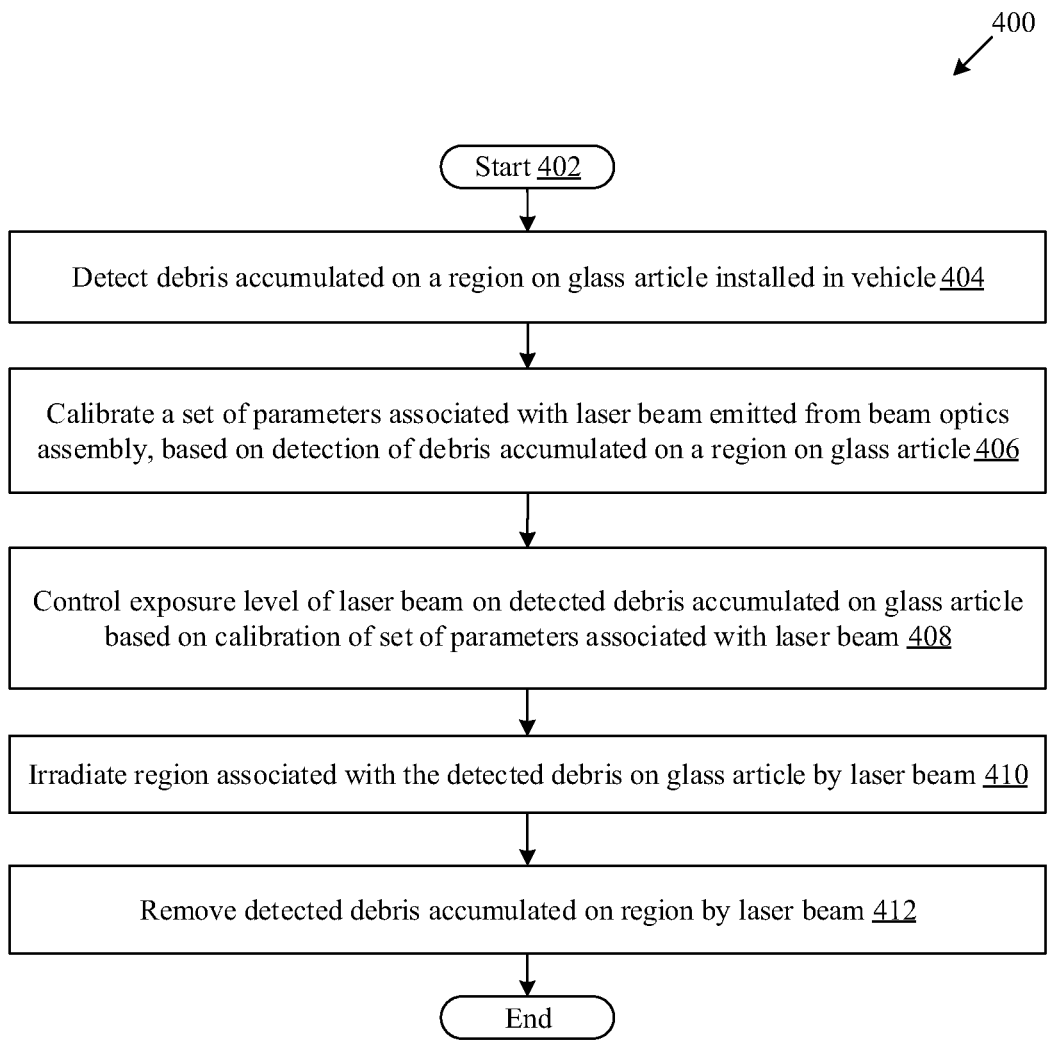
FIG. 4 is a flowchart that illustrates a method for laser cleaning of debris accumulated on glass articles in vehicles and photovoltaic assemblies, in accordance with various embodiments of the disclosure.

FIG. 4 is a flowchart that illustrates a method of laser cleaning of debris accumulated on a glass article in vehicles and photovoltaic assemblies, in accordance with various embodiments of the disclosure. FIG. 4 is explained in conjunction with elements from FIG. 1, FIG. 2A, FIG. 2B, and FIG. 3. With reference to FIG. 4, there is shown a flowchart 400. The exemplary operations of the flowchart 400, implemented in the cleaning apparatus 102, begins at 402 and proceeds to 404.

At 404, the debris accumulated on a region, such as a surface region, of the glass article 114 installed in a vehicle, may be detected. The debris detection circuitry 106 may be configured to detect the debris (e.g., the debris 210 as shown in FIGS. 2A and 2B) accumulated on the surface region of the glass article 114 in the vehicle 200B.

At 406, a set of parameters associated with the laser beam emitted from the beam optics assembly 110 may be calibrated, based on the detection of the debris accumulated on the region of the glass article 114. The control circuitry 112 may be configured to calibrate a set of parameters associated with the laser beam emitted from the beam optics assembly 110, based on the detection of the debris accumulated on the region of the glass article 114.

At 408, an exposure level of the laser beam may be controlled on the detected debris accumulated on the glass article 114 based on the calibration of the set of parameters associated with the laser beam. The control circuitry 112 may be configured to control an exposure level of the laser beam on the detected debris accumulated on the glass article 114, based on the calibration of the set of parameters associated with the laser beam.

At 410, the region on the glass article 114 that is associated with the detected debris may be irradiated with the laser beam. The control circuitry 112 may utilize the beam optics assembly 110 to irradiate a region associated with the detected debris on the glass article 114 by the laser beam.

At 412, the detected debris accumulated on the region may be removed by the laser beam. The control circuitry 112 may be configured to utilize the laser beam to remove the detected debris accumulated on a region of the glass article 114. The control passed to end.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process. It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A cleaning apparatus for a vehicle, comprising:
   a beam optics assembly configured to emit a laser beam to irradiate a region on a glass article that is installed in the vehicle;
   a debris detection circuitry configured to:
      detect a plurality of accumulations at associated positions over the region on the glass article, and
      identify a subset of the accumulations as being debris removable by the laser beam, wherein a remaining subset of the accumulations are identified as being non-removable; and
   control circuitry configured to:
      calibrate a set of parameters associated with the laser beam emitted from the beam optics assembly based on detection of the debris accumulated over the region on the glass article;
      control an exposure level of the laser beam on the debris accumulated over the region on the glass article based on calibration of the set of parameters associated with the laser beam, wherein the exposure level is controlled based on pulsing the laser beam at a calibrated rate that limits penetration of the laser beam to a depth that is less than a thickness of the glass article; and
      remove the debris at the associated positions over the region on the glass article by the laser beam, wherein the laser beam is directed on the debris accumulated over the region on the glass article at the exposure level during an exposure period to mitigate a risk of damage to different in-vehicle components beneath the region on the glass article, wherein the laser beam is not directed on the remaining subset of the accumulations.

2. The cleaning apparatus according to claim 1, wherein the set of parameters comprises at least one of a wavelength associated with the laser beam, a frequency associated with the laser beam, a spot radius formed by the laser beam on the glass article, a pulse duration of the laser beam, a peak power of the laser beam, a number of pulses associated with the laser beam, a focal length of a lens in the beam optics assembly, or an angle of incidence of the laser beam on the debris.

3. The cleaning apparatus according to claim 1, wherein:
   the glass article is a vehicle windshield; and
   the control circuitry is configured to identify the debris on the vehicle windshield.

4. The cleaning apparatus according to claim 3, wherein the control circuitry is configured to identify the debris on a specific region of the vehicle windshield.

5. The cleaning apparatus according to claim 1, wherein the debris detection circuitry includes an optical sensor, and wherein the debris detection circuitry is configured to determine respective types of the debris based on the optical sensor, wherein the set of parameters is calibrated based on the determined types.

6. The cleaning apparatus according to claim 5, wherein the optical sensor includes at least one of a built-in camera, a dash camera, a rear-view camera or a surround view camera.

7. The cleaning apparatus according to claim 1, wherein the debris detection circuitry includes a transparent or resistive layer overlaid on the glass article.

8. The cleaning apparatus according to claim 1, wherein the beam optics assembly is configured to steer energy of the emitted laser beam.

9. The cleaning apparatus according to claim 1, wherein the beam optics assembly is configured to beam form energy of the emitted laser beam.

10. The cleaning apparatus according to claim 1, wherein the beam optics assembly is configured to focus beam form energy of the emitted laser beam across a specific region of the glass article.

* * * * *